(12) United States Patent
Yuhi et al.

(10) Patent No.: US 8,353,185 B2
(45) Date of Patent: Jan. 15, 2013

(54) VEHICLE HANDLE LOCKING APPARATUS

(75) Inventors: Kazuo Yuhi, Miyazaki (JP); Takashi Ishitsuka, Miyazaki (JP); Katsuhisa Yamada, Saitama (JP); Hiroshi Nishijima, Saitama (JP); Yoshiaki Takeuchi, Saitama (JP)

(73) Assignees: Kabushiki Kaisha Honda Lock, Miyazaki (JP); Honda Motor Co., Ltd., Tokyo (JP)

( * ) Notice: Subject to any disclaimer, the term of this patent is extended or adjusted under 35 U.S.C. 154(b) by 400 days.

(21) Appl. No.: 12/716,897

(22) Filed: Mar. 3, 2010

(65) Prior Publication Data

US 2010/0236304 A1    Sep. 23, 2010

(30) Foreign Application Priority Data

Mar. 17, 2009  (JP) ................. 2009-064555
Mar. 17, 2009  (JP) ................. 2009-064556
Mar. 17, 2009  (JP) ................. 2009-064557

(51) Int. Cl.
*B60R 25/02* (2006.01)

(52) U.S. Cl. ............................ 70/186; 70/252

(58) Field of Classification Search ............ 70/182–186, 70/233, 252, 256, 257, 278.7, 279.1, 283; 307/9.1, 10.3, 10.6; 292/144
See application file for complete search history.

(56) References Cited

U.S. PATENT DOCUMENTS

| | | | |
|---|---|---|---|
| 4,638,882 A | 1/1987 | Sato | |
| 5,124,565 A | 6/1992 | Yoshida | |
| 6,539,756 B2 * | 4/2003 | Bartels et al. | 70/186 |
| 6,889,532 B2 * | 5/2005 | Fukushima | 70/185 |
| 7,021,093 B2 * | 4/2006 | Fukatsu et al. | 70/186 |
| 8,099,986 B2 * | 1/2012 | Takeuchi et al. | 70/186 |
| 2002/0066295 A1 * | 6/2002 | Jacobs et al. | 70/186 |
| 2004/0107750 A1 * | 6/2004 | Fukushima | 70/186 |
| 2006/0261673 A1 * | 11/2006 | Unno | 307/10.1 |
| 2008/0156050 A1 * | 7/2008 | Konno et al. | 70/233 |
| 2010/0212377 A1 * | 8/2010 | Graglia | 70/183 |
| 2010/0229611 A1 * | 9/2010 | Konno et al. | 70/252 |

FOREIGN PATENT DOCUMENTS

| | | |
|---|---|---|
| DE | 40 19 478 A1 | 1/1991 |
| EP | 1 975 049 A2 | 10/2008 |
| JP | 06247358 A | 9/1994 |
| JP | 2735454 B2 | 1/1998 |

* cited by examiner

*Primary Examiner* — Lloyd Gall
(74) *Attorney, Agent, or Firm* — Arent Fox LLP (57) ABSTRACT

In a vehicle handle locking apparatus, a locking member that can operate between a locked position and an unlocked position and a holding member that operates together with the locking member are resiliently urged toward the unlocked position side; and an engaging member that engages with a holding member in the locked position and holds the locking member in the locked position is operated by operation of an electric actuator toward the side to release the engagement with the holding member. Forced unlocking drive device forcibly drives the holding member toward the unlocked position side in response to the operation of the electric actuator in a state in which the locking member is in the locked position. Accordingly, it is possible to provide a vehicle handle locking apparatus that releases, even when a force in a rotating direction is applied to a steering handle, engagement of a locking member with the steering handle or a linkage member so that an unlocked state is reliably achieved.

10 Claims, 9 Drawing Sheets

VEHICLE HANDLE LOCKING APPARATUS

BACKGROUND OF THE INVENTION

1. Field of the Invention

The present invention relates to a vehicle handle locking apparatus comprising: a locking member that can operate between a locked position in which the locking member engages with a steering handle or a linkage member that operates together with the steering handle and an unlocked position in which engagement of the locking member with the steering handle or the linkage member is released; a holding member that holds the locking member so as to operate together with the locking member; a resilient member that resiliently urges the locking member and the holding member toward the unlocked position side; an engaging member that engages with the holding member in the locked position and holds the locking member in the locked position; and an electric actuator that at least exerts power causing the engaging member to operate toward the side on which engagement of the engaging member with the holding member in the locked position is released.

2. Description of the Related Art

A vehicle handle locking apparatus is known in Japanese Patent Publication No. 2735454, in which a holding member that holds a locking member is urged toward an unlocked position side with a spring, and a rotation member that engages with the holding member rotates in one direction in response to manual operation and is thereby urged with a spring in another direction so as to cause the locking member to operate toward the locked position side; an engaging member is engaged with the rotation member so as to prevent the rotation member from rotating in the other direction in the state in which the locking member is at the locked position; engagement of the engaging member with the rotation member is released by an operation of an electric actuator; and the locking member and the holding member are thereby moved to the unlocked position side by an urging force with a spring.

However, in the handle locking apparatus disclosed in Japanese Patent Publication No. 2735454 above, when a force in the rotation direction is applied to the shaft of the steering handle with the locking member engaged with the shaft, even if the state in which movement of the holding member toward the unlocked position is blocked by the engaging member is released, only the spring urging force of the holding member toward the unlocked position side may not cause the locking member and the holding member to smoothly move to the unlocked positions.

SUMMARY OF THE INVENTION

The present invention has been implemented in view of the above described circumstances and it is an object of the present invention to provide a vehicle handle locking apparatus that can release, even when a force in a rotation direction is applied to a steering handle, engagement of a locking member with the steering handle or a linkage member so that an unlocked state is reliably achieved.

In order to achieve the object, according to a first feature of the present invention, there is provided a vehicle handle locking apparatus comprising: a locking member that can operate between a locked position in which the locking member engages with a steering handle or a linkage member that operates together with the steering handle and an unlocked position in which engagement of the locking member with the steering handle or the linkage member is released; a holding member that holds the locking member so as to operate together with the locking member; a first resilient member that resiliently urges the locking member and the holding member toward the unlocked position side; an engaging member that engages with the holding member in the locked position and holds the locking member in the locked position; an electric actuator that at least exerts power causing the engaging member to operate toward the side on which engagement of the engaging member with the holding member in the locked position is released; and forced unlocking drive means for forcibly driving the holding member toward the unlocked position side in response to operation of the electric actuator in a state in which the locking member is in the locked position.

According to such a first feature, when the locked state in which the steering handle or the linkage member is engaged with the locking member is released, the electric actuator is operated to release engagement of the engaging member with the holding member and the holding member is forcibly driven toward the unlocked position side by the forced unlocking drive means; therefore, in addition to the resilient urging force toward the unlocked position side, the output of the electric actuator is transmitted to the holding member by the forced unlocking drive means, and it is thereby possible to reliably set an unlocked state by releasing engagement of the locking member with the steering handle or the linkage member even when a force in the rotation direction is applied to the steering handle or the linkage member.

According to a second feature of the present invention, in addition to the first feature, the engaging member is rotatably supported by a fixed casing so as to be rotatable around an axis disposed on a plane orthogonal to a linear slide operation direction of the holding member between an engagement position at which the engaging member engages with the holding member in the locked position from the unlocked position side and a disengagement position at which the engaging member retracts laterally of the holding member and releases engagement thereof with the holding member, and a second resilient member that urges the engaging member toward the engagement position side is provided between the casing and the engaging member.

According to such a second feature, the engaging member can rotate around the axis disposed on the plane orthogonal to the slide operation direction of the holding member and is urged toward the engagement position side by the second resilient member, and when the engaging member is engaged with the holding member, it is possible to make the direction of load acting on the engaging member from the holding member and the resilient urging direction of the second resilient member orthogonal to each other and thereby set a small resilient load of the second resilient member.

According to a third feature of the present invention, in addition to the second feature, the forced unlocking drive means comprises a movable member that can move in response to operation of the electric actuator in a direction parallel to the slide operation direction of the holding member between a lock operating position when the holding member is in the locked position and an unlock operating position when the holding member is in the unlocked position, and the movable member comprises: a first contacting section that contacts with the engaging member in the engagement position at the time when the movable member moves from the lock operating position to the unlock operating position, and drives the engaging member to rotate toward the disengagement position side; and a second contacting section that contacts with the holding member in the engagement position at the time when the movable member moves from the lock operating position to the unlock operating position, and presses and drives the holding member toward the unlocked position side.

According to such a third feature, the movable member provided for the forced unlocking drive means is moved from the lock operating position to the unlock operating position in response to the operation of the electric actuator, and it is thereby possible to make the first contacting section contact with the engaging member and cause the engaging member to rotate toward the disengagement position side against the urging force of the second resilient member and further cause the second contacting section to contact with the holding member disengaged from the engaging member and thereby allow the second contacting section to press and drive the holding member toward the unlocked position side.

According to a fourth feature of the present invention, in addition to the first feature, a tubular guide member that allows the lock pin, which is the locking member, to slide between the locked position and the unlocked position and fit thereinto in a slidable manner is connectingly provided in a fixed casing that accommodates the electric actuator which exerts power to move the lock pin toward at least one of the locked position and the unlocked position, so as to protrude from the casing, and a ring-shaped sealing member is interposed between the guide member and the lock pin. According to such a configuration, the ring-shape sealing member is interposed between the lock pin and guide member, and it is thereby possible to reliably prevent rainwater or the like from infiltrating into the casing through the gap between the lock pin and guide member, thus preventing rainwater or the like from adversely affecting electric parts such as the electric actuator accommodated in the casing.

According to a fifth feature of the present invention, in addition to the fourth feature, the guide member comprises a slide hole that allows the lock pin to slidably fit thereinto and an insertion hole having a diameter larger than that of the slide hole and provided continuously and coaxially with an outer end of the slide hole, and the sealing member is mounted to an inner periphery of the insertion hole so as to be resiliently in sliding contact with an outer periphery of the lock pin. According to such a configuration, it is possible to prevent rainwater or the like from infiltrating into the gap between the inner periphery of the slide hole and outer periphery of the lock pin using the sealing member, and thereby prevent an occurrence of the state in which rainwater or the like infiltrated in the gap between the inner periphery of the slide hole and outer periphery of the lock pin freezes and thus the lock pin can not slide smoothly.

According to a sixth feature of the present invention, in addition to the fourth or fifth feature, the guide member extending in an up-and-down direction is disposed below a portion to be engaged which is provided to the steering handle or the linkage member, and the guide member is provided with a drain cutout above the sealing member. According to such a configuration, the guide member is provided with a drain cutout above the sealing member, and it is thereby possible to prevent rainwater or the like from accumulating on the upper part of the guide member.

According to a seventh feature of the present invention, in addition to the first feature, the vehicle handle locking apparatus further comprises: cable locking drive means moving together and linked with the locking member so that a pulling operation of a cable causes the locking member to operate from the unlocked position to the locked position; pulling operation detecting means for detecting the pulling operation of the cable; movement restricting means that enables restriction of movement of the locking member from the unlocked position to the locked position and releases the restriction in response to operation of the electric actuator; and a control unit that carries out communication with a portable device held by a user in response to detection of the pulling operation of the cable by the pulling operation detecting means, and causes the electric actuator to operate so as to release the movement restriction by the movement restricting means in response to confirmation through the communication that the user is a legitimate user.

According to the configuration of such a seventh feature, when the cable is operated and pulled to move the locking member to the locked position, the movement restricting means prevents the locking member from moving to the locked position unless the user is authenticated as a legitimate user who holds a legitimate portable device, and therefore even if a third party other than the legitimate user operates the cable with malicious intent, it is possible to prevent the locking member from undesirably moving to the locked position.

According to an eighth feature of the present invention, in addition to the seventh feature, the movement restricting means comprises: the holding member, one end of which is connected to the locking member so as to operate together with the locking member and the other end of which moves together with and is connected to the cable; and a movable member that engages with the holding member from the locked position side when the locking member and the holding member are in the unlocked position and moves in a direction parallel to an operating direction of the holding member through operation of the electric actuator, and the control unit controls the operation of the electric actuator so as to cause the movable member to move in a direction in which engagement thereof with the holding member is released when releasing the movement restriction by the movement restricting means. According to such a configuration, it is possible to easily switch between movement restriction and release of movement restriction, and simplify the configuration of the movement restricting means.

According to a ninth feature of the present invention, in addition to the seventh or eighth feature, there is provided the vehicle handle locking apparatus, further comprising: locked position detecting means for detecting that the locking member is in the locked position and inputting a signal of the detection to the control unit; and informing means operated and controlled by the control unit, wherein the control unit causes the informing means to perform an informing operation when the pulling operation detecting means detects a pulling operation of the cable and when the signal detecting that the locking member is in the locked position is not inputted from the locked position detecting means. According to such a configuration, when the vehicle driver operates and pulls the cable so as to move the locking member to the locked position, if the detecting means does not detect that the locking member has reached the locked position, the informing means performs informing operation; and it is thereby possible to prevent the vehicle driver from mistaking for a locked state a state in which the locking member is hold in a midway locked state by a traverse load applied to the steering handle before the locking member reaches the locked position, and notify the vehicle driver of the fact that the locking member has not completely reached the locked position and thereby improve the level of burglar prevention.

According to a tenth feature of the present invention, in addition to the eighth feature, there is provided the vehicle handle locking apparatus, further comprising locked position detecting means for detecting that the locking member is in the locked position and inputting a signal of the detection to the control unit, wherein the control unit causes the electric actuator to operate so as to move the movable member so that the holding member is pressed and driven toward the unlocked position side when the pulling operation detecting means detects a pulling operation of the cable and when the signal detecting that the locking member is in the locked position is not inputted from the locked position detecting means. According to such a configuration, when the vehicle driver operates and pulls the cable so as to move the locking member to the locked position, if the detecting means does not detect that the locking member has reached the locked position, the electric actuator operates so as to move the movable member in order for the slider to be pressed and driven to the unlocked position side; and it is thereby possible to release the state in which the lock pin is hold in the midway locked state, forcibly drive the lock pin toward the unlocked position side and move the lock pin to the locked position when the vehicle driver operates and pulls the cable again.

Here, a front fork 16 of an embodiment corresponds to the linkage member of the present invention; a top bridge 17 of the embodiment corresponds to the portion to be engaged of the present invention; a lock pin 18 of the embodiment corresponds to the locking member of the present invention; a slider 19 of the embodiment corresponds to the holding member of the present invention; a coil spring 20 of the embodiment corresponds to the first resilient member of the present invention; an electric motor 22 of the embodiment corresponds to the electric actuator of the present invention; a small diameter slide hole 35 of the embodiment corresponds to the slide hole of the present invention; a second sealing member 37 of the embodiment corresponds to the sealing member of the present invention; a torsion spring 43 of the embodiment corresponds to the second resilient member of the present invention; a nut 45 of the embodiment corresponds to the movable member of the present invention; a first switch 65 and a fourth switch 68 of the embodiment correspond to the locked position detecting means of the present invention; and a fifth switch 69 of the embodiment corresponds to the pulling operation detecting means of the present invention.

The above description, other objects, characteristics and advantages of the present invention will be clear from detailed descriptions which will be provided for the preferred embodiments referring to the attached drawings.

DESCRIPTION OF THE PREFERRED EMBODIMENT

Hereinafter, an embodiment of the present invention will be described in detail with reference to FIG. 1 to FIG. 9. First, in FIG. 1, a handle locking apparatus 13 that can hold a bar-shaped steering handle 12 in a locked state is accommodated inside an instrument panel 11 disposed at the front of this two-wheeled motor vehicle, and an ignition switch 14 and a handle lock lever 15 are disposed on the instrument panel 11.

In FIG. 2 to FIG. 5, the handle locking apparatus 13 engages with the steering handle 12 or a linkage member that operates together with the steering handle 12 to hold the steering handle 12 in a locked state in which the steering handle 12 is prevented from rotating. In the present embodiment, the locked state of the steering handle 12 can be held by the handle locking apparatus 13 engaging with a top bridge 17 of a front fork 16, which is a linkage member that rotates and operates together with the steering handle 12.

The handle locking apparatus 13 includes a lock pin 18, which is a locking member that can operate between a locked position at which the handle locking apparatus 13 engages with the top bridge 17 (position illustrated in FIG. 2 and FIG. 4) and an unlocked position at which engagement with the top bridge 17 is released (position illustrated in FIG. 3 and FIG. 5), a slider 19, which is a holding member that holds the lock pin 18 so as to operate together with the lock pin 18, a coil spring 20, which is a first resilient member that resiliently urges the lock pin 18 and the slider 19 toward the unlocked position side, an engaging member 21 that engages with the slider 19 at the locked position and holds the lock pin 18 in the locked position, an electric motor 22, which is an electric actuator freely rotatable forward or backward that at least exerts power to operate the engaging member 21 toward the side on which engagement with the slider 19 located in the locked position is released, forced unlocking drive means 23 that forcibly drives the slider 19 toward the unlocked position side in response to the operation of the electric motor 22 in a state in which the lock pin 18 is in the locked position, cable locking drive means 25 that moves together and links with the lock pin 18 so as to cause the lock pin 18 to operate from the unlocked position to the locked position through a pulling operation of a cable 24, and movement restricting means 26 capable of restricting the movement of the lock pin 18 from the unlocked position to the locked position and releasing the restriction in response to the operation of the electric motor 22.

Figure 6:
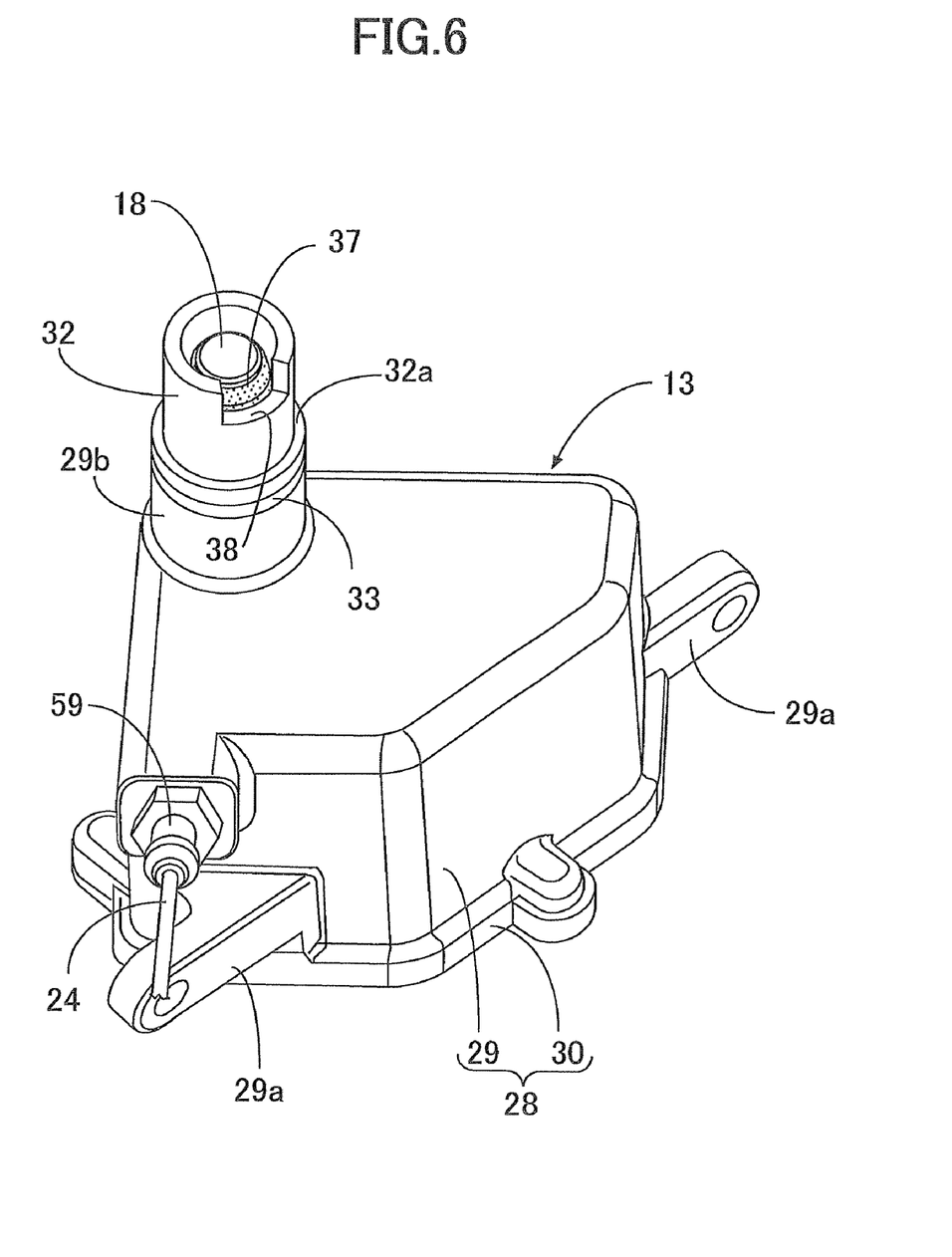
FIG. 6 is a perspective view of a casing and a guide member.

Referring to FIG. 6 as well, a casing 28 of the handle locking apparatus 13 is fixedly disposed below the top bridge 17, and comprises a box-shaped casing body 29, which is open downward, and a capping member 30 attached to the casing body 29 so as to cover the bottom open end of the casing body 29. A plurality of, for example, a pair of support arms 29a, which are provided integral with the casing body 29 and protrude sideward from the casing body 29, are attached to a vehicle body frame (not shown) of the two-wheeled motor vehicle.

The casing body 29 is provided with, as integral parts, a support cylindrical section 29b that forms a support hole 31 and extends upward from the casing body 29 and an inward collar section 29c that projects inward in a radius direction from the lower end of the support cylindrical section 29b. A cylindrical guide member 32, which extends in an up-and-down direction, is press-fitted in the support hole 31 such that the top end thereof protrudes upward from the support cylindrical section 29b of the casing 28 and the lower end thereof abuts against the inward collar section 29c, and a ring-shaped first sealing member 33 is interposed between a flange section 32a provided integral with the guide member 32 above the support cylindrical section 29b and the upper end of the support cylindrical section 29b.

Figure 1:
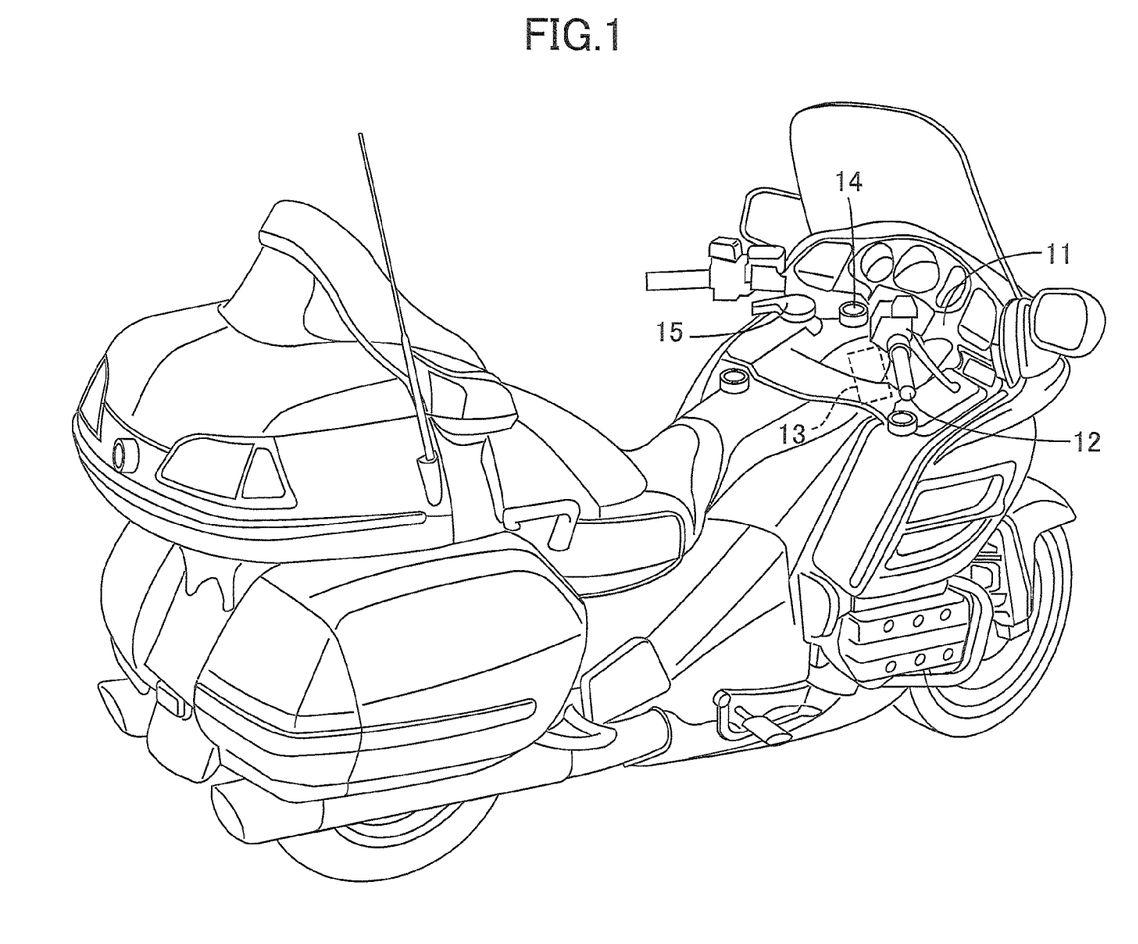
FIG. 1 is a perspective view of a two-wheeled motor vehicle.
Figure 2:
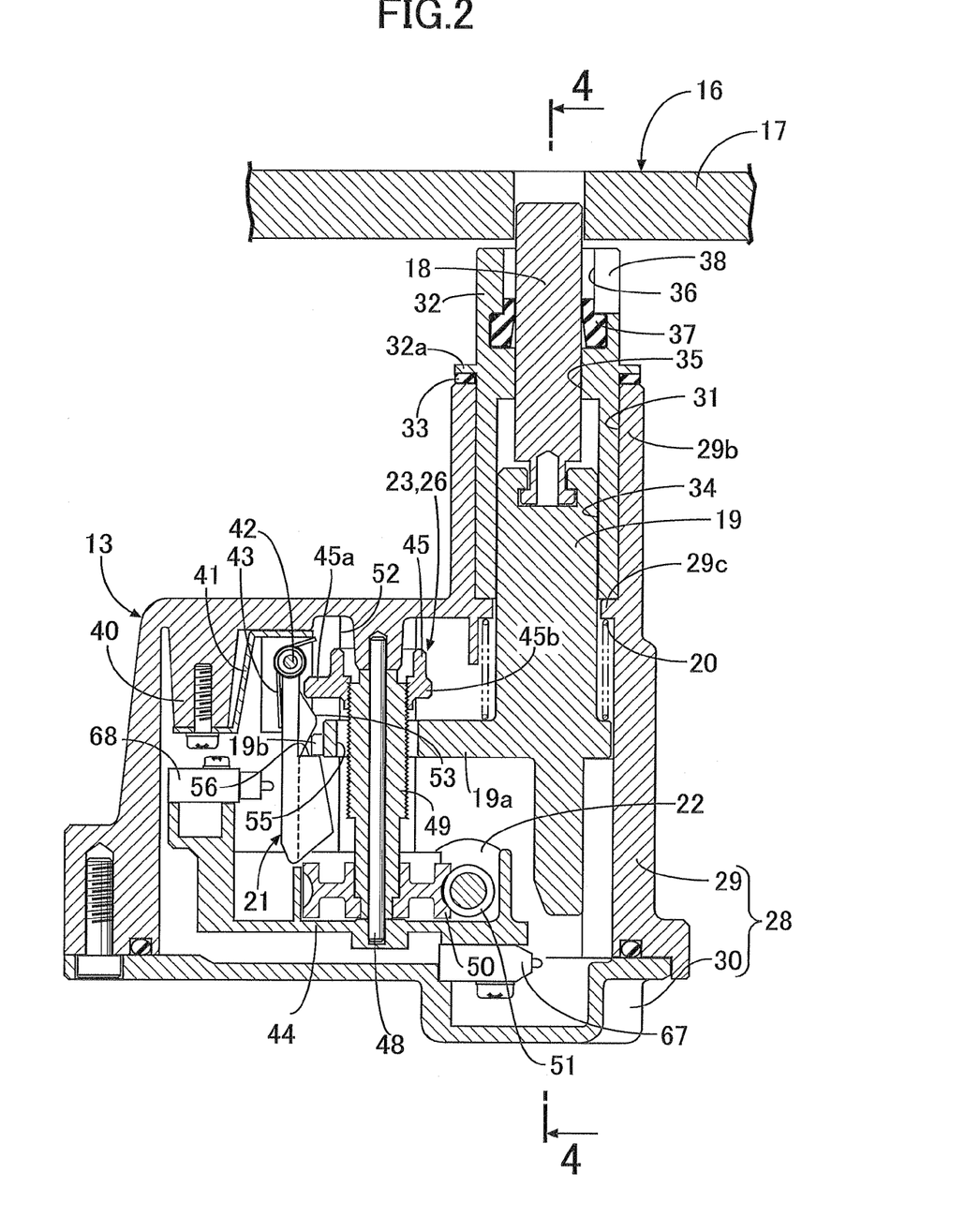
FIG. 2 is a longitudinal cross-sectional view of a handle locking apparatus in a state in which a lock pin is at a locked position.
Figure 3:
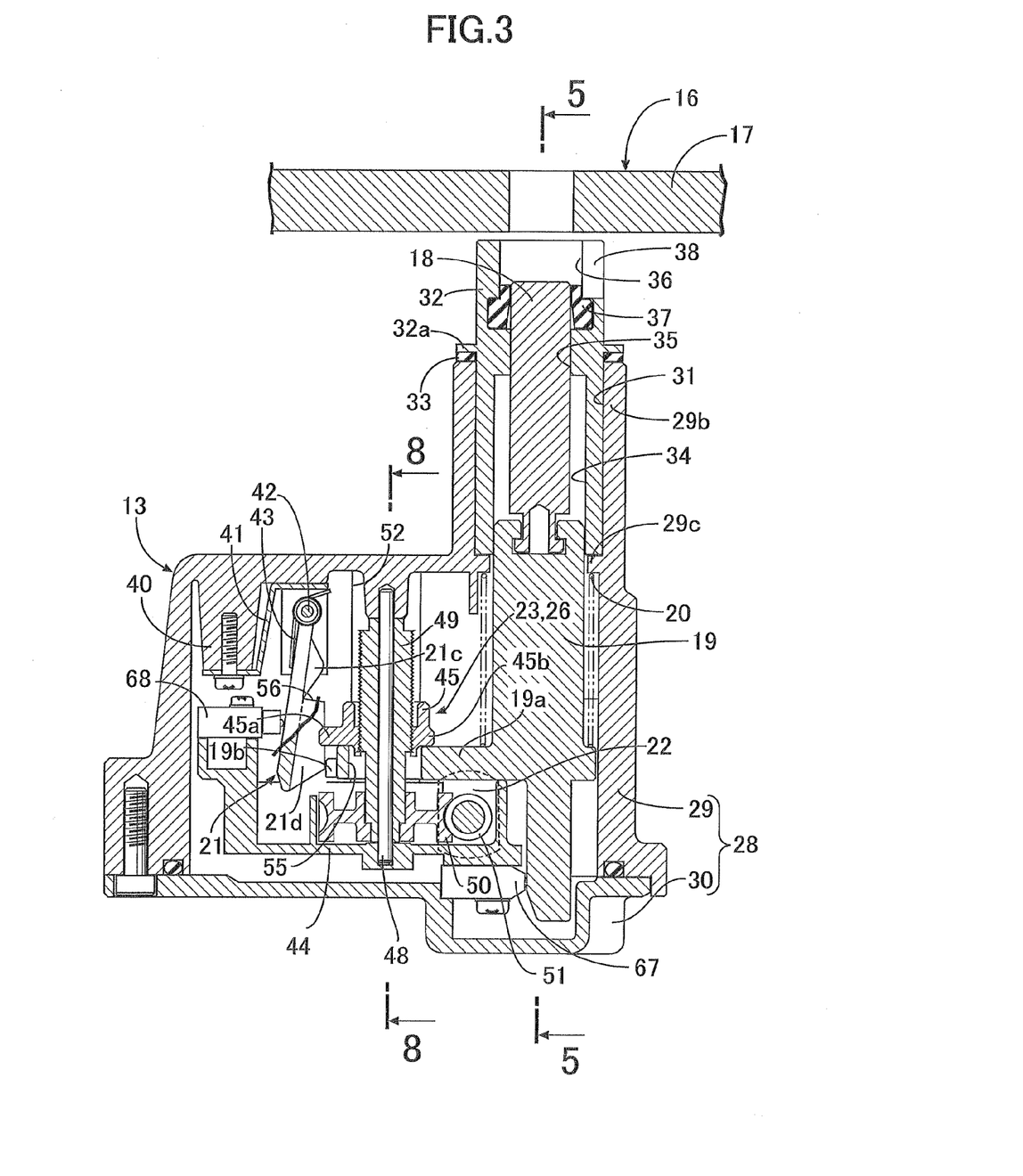
FIG. 3 is a longitudinal cross-sectional view of the handle locking apparatus in a state in which a lock pin is at an unlocked position.

The guide member 32 is provided with a large diameter slide hole 34, a small diameter slide hole 35 of smaller diameter than that of the large diameter slide hole 34, and an insertion hole 36 of larger diameter than that of the small diameter slide hole 35 which are coaxially continued in the sequence from the lower end to the upper end of the guide member 32. The upper part of the slider 19 inserted in the inward collar section 29c is slidably fitted into the large diameter slide hole 34 and the lock pin 18 coupled with the upper part of the slider 19 is slidably fitted into the small diameter slide hole 35. Furthermore, the coil spring 20 is installed in a compressed state between the casing body 29 of the casing 28 and the slider 19, and the slider 19 and the lock pin 18 are resiliently urged with the coil spring 20 toward the unlocked position side, that is, the side (downward side) on which engagement of the lock pin 18 with the top bridge 17 is released.

A ring-shaped second sealing member 37 is interposed between the guide member 32 and the lock pin 18, and the second sealing member 37 is fitted to the inner periphery of the insertion hole 36 so as to be resiliently in sliding contact with the outer periphery of the lock pin 18. Moreover, the guide member 32 is provided with a drain cutout 38 above the second sealing member 37.

The engaging member 21 is accommodated in the casing 28 at a position laterally spaced apart from the slider 19 and rotatably supported by the casing 28 so as to be rotatable around the axis disposed on the plane orthogonal to the linear slide operation direction of the lock pin 18 and the slider 19 between an engagement position in which the engaging member 21 engages with the slider 19 in the locked position from the unlocked position side and a disengagement position in which the engaging member 21 retracts laterally of the slider 19 and releases engagement with the slider 19.

A support member 41 is fastened to a support boss 40 provided, as an integral part, so as to protrude at the upper part of the casing body 29 of the casing 28, a support shaft 42 whose axis is disposed on the plane orthogonal to the linear slide operation direction of the lock pin 18 and the slider 19 is supported by the support member 41 and the engaging member 21 is rotatably supported by the support shaft 42.

Figure 7:
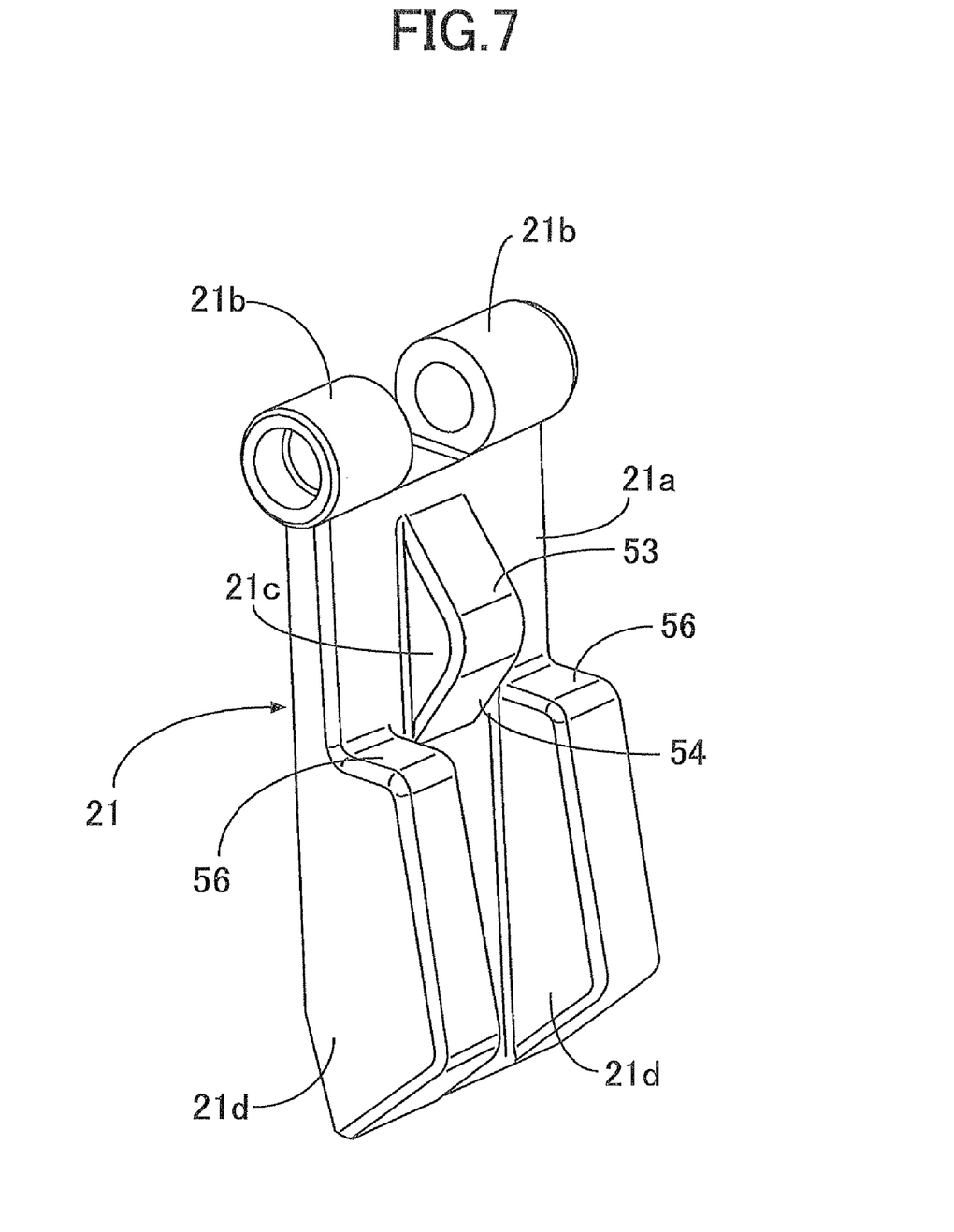
FIG. 7 is a perspective view of an engaging member.

Referring to FIG. 7 as well, the engaging member 21 includes, as integral parts, a flat plate section 21a facing the slider 19 from one side thereof, a pair of cylindrical sections 21b through which the support shaft 42 passes and which are provided at opposite ends of the upper end of the flat plate section 21a, a single first engagement protrusion 21c which is disposed between the two cylindrical sections 21b in a plan view and below the two cylindrical sections 21b in a side view and which is provided in a protruding manner on the central part of the surface of the flat plate section 21a facing the slider 19, and a pair of second engagement protrusions 21d disposed below the first engagement protrusion 21c and provided in a protruding manner on opposite sides on the surface of the flat plate section 21a facing the slider 19. The second engagement protrusions 21d are formed such that the lower the position thereof, the greater is the amount of projection from the flat plate section 21a.

A torsion spring 43, which is a second resilient member, is provided between the support member 41 and the engaging member 21 so as to surround the support shaft 42, and the engaging member 21 is resiliently urged toward the engagement position side, that is, the side on which the first engagement protrusion 21c and second engagement protrusions 21d are made to be close to the slider 19 by a resilient force exerted by the torsion spring 43.

The electric motor 22 is accommodated at the lower part in the casing 28 so as to be supported on a support frame 44, which is fixedly disposed in the casing 28, and the forced unlocking drive means 23 includes a nut 45 that can move in a direction parallel to the slide operation direction of the slider 19 in response to the operation of the electric motor 22 between a lock operating position when the slider 19 is at a locked position (position illustrated in FIG. 2 and FIG. 4) and an unlock operating position when the slider 19 is at an unlocked position (position illustrated in FIG. 3 and FIG. 5), and the nut 45 is provided with a first contacting section 45a that contacts, from above, the first engagement protrusion 21c of the engaging member 21 located at the engagement position at the time of movement from the lock operating position to the unlock operating position thereof to drive the engaging member 21 to rotate toward the disengagement position side, and a second contacting section 45b that contacts the slider 19 located at the locked position at the time of movement from the lock operating position to the unlock operating position, and presses and drives the slider 19 toward the unlocked position side.

Opposite ends of a shaft 48 having an axis parallel to the axis of the guide member 32 are supported between the axis of the guide member 32 and the engaging member 21, and a helical gear 50 is fixed at the lower end of a cylindrically formed screw shaft 49, which surrounds the shaft 48 and rotatably supported to the shaft 48. A pinion 51 provided on the output shaft of the electric motor 22 is engaged with the helical gear 50, and the nut 45 and the screw shaft 49 are fitted together by screwing. Furthermore, the nut 45 is fitted into a groove 52, which is provided in the inner surface of the casing body 29 of the casing 28 and extends in an up-and-down direction, and the nut 45 is thereby prevented from rotating around the axis of the shaft 48 and the screw shaft 49, and the nut 45 moves upward or downward between the upper lock operating position and the lower unlock operating position as the screw shaft 49 rotates through the operation of the electric motor 22.

Incidentally, the upper part of the first engagement protrusion 21c of the engaging member 21 is formed as a first inclined plane 53 inclined such that the lower the position thereof, the greater is the distance from the flat plate section 21a, the first contacting section 45a of the nut 45 comes into contact with the first inclined plane 53 of the first engagement protrusion 21c at the time of movement from the lock operating position to the unlock operating position thereof, and the nut 45 moves to the unlock operating position in such a way as to push the engaging member 21 to retract to the disengagement position side. Furthermore, the lower part of the first engagement protrusion 21c is formed as a second inclined plane 54 inclined such that the lower the position thereof, the smaller is the distance from the flat plate section 21a.

The slider 19 is provided with, as an integral part, an arm 19a, which is located below the nut 45 and extends toward the engaging member 21, and the arm 19a is provided with a through hole 55 that allows the screw shaft 49 to penetrate therethrough and also allows the lower part of the nut 45 to be inserted therein. The second contacting section 45b of the nut 45 can contact the arm 19a at a peripheral edge of the through hole 55 from above.

A pair of protrusions 19b individually corresponding to the pair of second engagement protrusions 21d of the engaging member 21 are provided in a protruding manner on a tip end of the arm 19a, and the protrusions 19b comes into contact with engagement planes 56 formed at the upper end of the two second engagement protrusions 21d from above when the nut 45 is at the lock operating position and when the slider 19 is at the locked position. This causes the downward movement of the arm 19a, that is, the slider 19, namely the movement toward the unlocked position, to be restricted.

When both protrusions 19b of the arm 19a of the slider 19 in the locked position is in contact with the engagement planes 56 of the engaging member 21 from above, if the nut 45 moves downward from the lock operating position to the unlock operating position through the operation of the electric motor 22, the first contacting section 45a of the nut 45 comes into contact with the first inclined plane 53 of the first engagement protrusion 21c of the engaging member 21 from above, so that the engaging member 21 is driven to rotate toward the disengagement position side. This releases engagement between the engagement planes 56 at the upper end of the second engagement protrusions 21d of the engaging member 21 and the protrusions 19b at the tip end of the arm 19a of the slider 19, and the slider 19 and the lock pin 18 move toward the unlocked position side by the resilient force of the coil spring 20. In this case, the first engagement protrusion 21c and the second engagement protrusions 21d are formed so that both protrusions 19b of the slider 19 move below the engagement planes 56 until the first contacting section 45a gets over the first engagement protrusion 21c. Furthermore, when both protrusions 19b of the slider 19 have moved below the engagement planes 56, both protrusions 19b are in contact with the second engagement protrusions 21d as illustrated in FIG. 3 and the engaging member 21 is held at the disengagement position when the slider 19 is at the unlocked position as illustrated in FIG. 3.

Furthermore, when engagement of the protrusions 19b with the engagement planes 56 is released, since a force in the rotation direction is applied to the steering handle 12, the slider 19 may not smoothly move to the unlocked position by the resilient force of the coil spring 20 alone, but even in such a case, the second contacting section 45b contacts the arm 19a of the slider 19 from above while the nut 45 is moving to the unlock operating position, and the slider 19 is thereby forcibly driven to the unlocked position.

Figure 4:
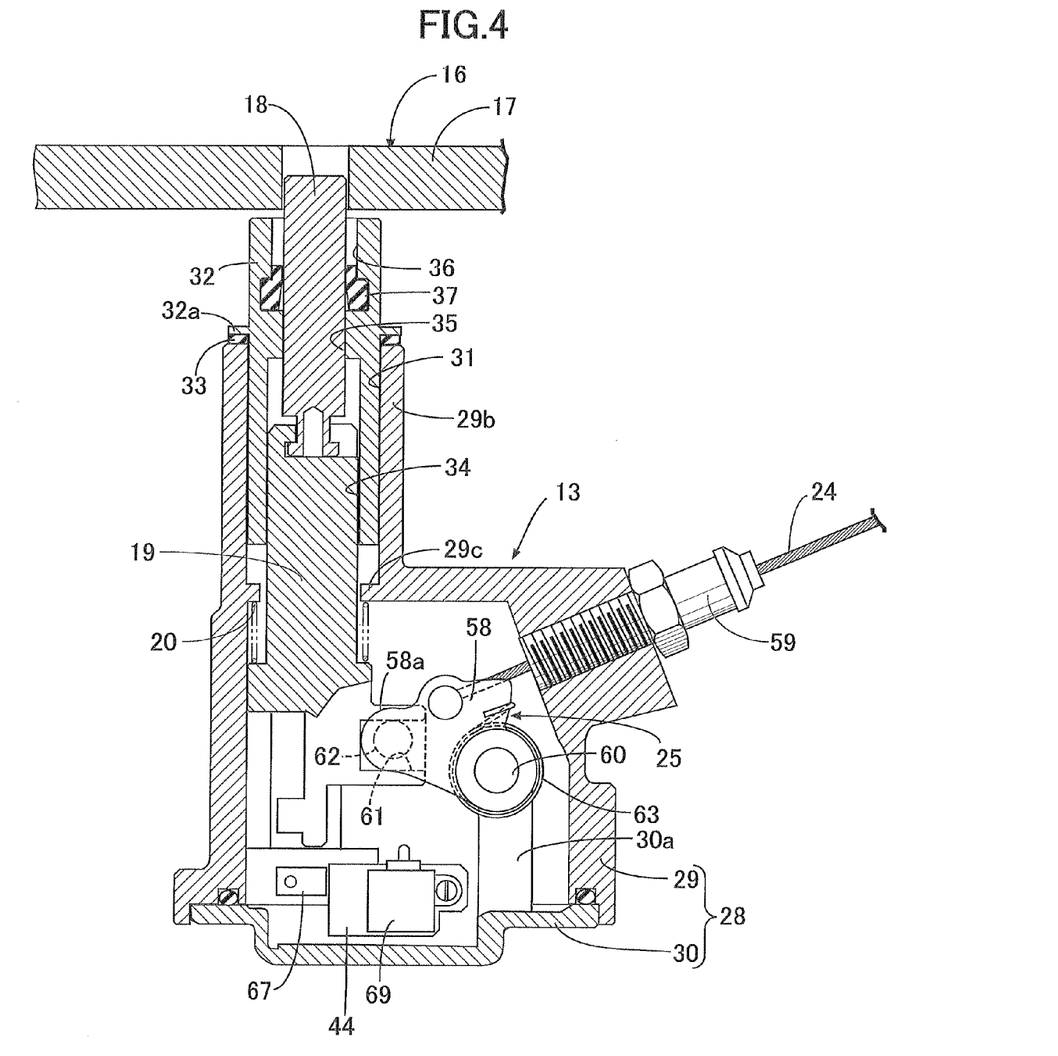
FIG. 4 is a cross-sectional view taken along a line 4-4 in FIG. 2.
Figure 5:
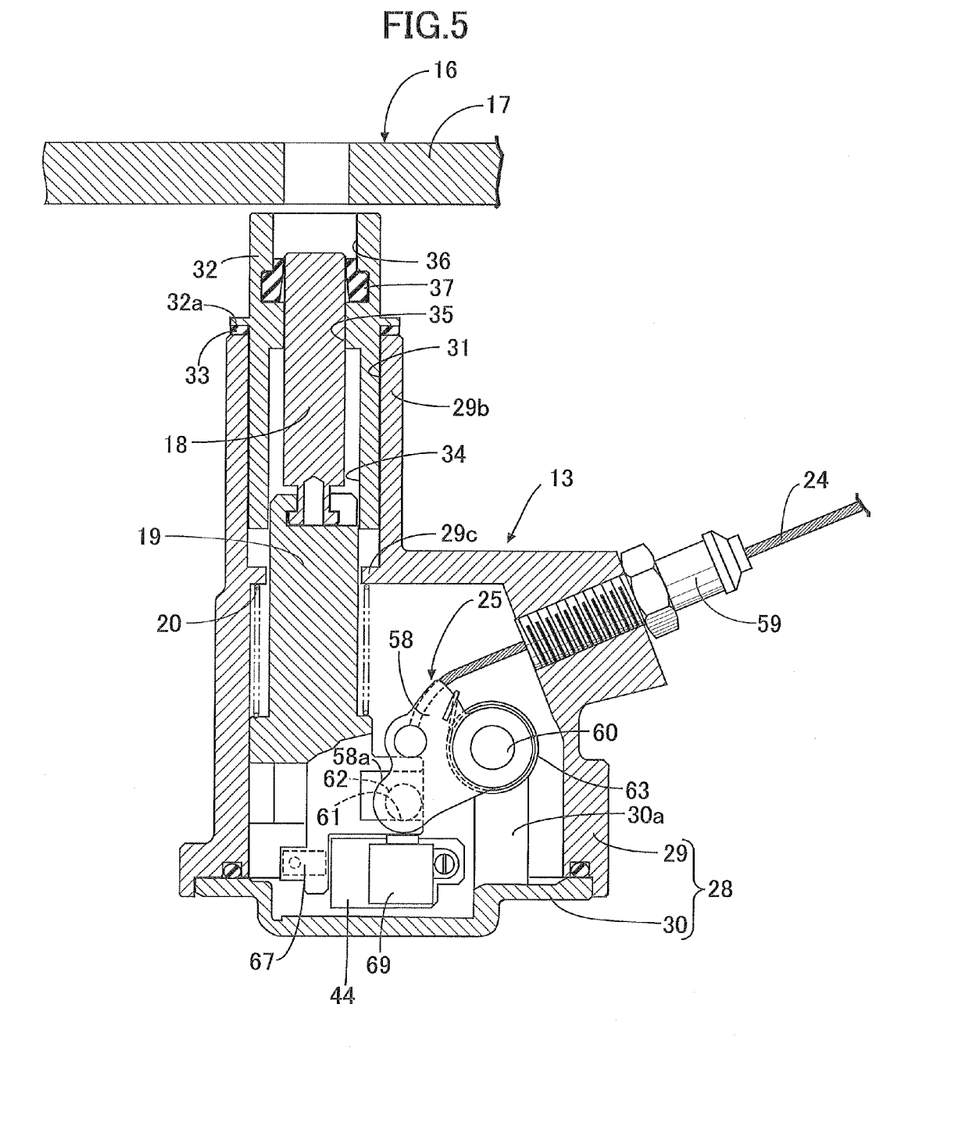
FIG. 5 is a cross-sectional view taken along a line 5-5 in FIG. 3.

Focusing on FIG. 4 and FIG. 5, the cable locking drive means 25 includes a cable 24 pulled in response to a rotation operation of the handle lock lever 15 disposed on the instrument panel 11, and a rotor 58 accommodated in the casing 28, linked with the cable 24 and also linked and connected with the slider 19.

The cable 24 passes through a guide tubular member 59 attached to the casing body 29 of the casing 28 in a movable manner and is pulled into the casing 28. On the other hand, the capping member 30 of the casing 28 is provided with, as an integral part, a support protrusion 30a that extends upward to the lateral side of the slider 19 and the rotor 58 is rotatably supported at the upper end of the support protrusion 30a via a support pin 60 having an axis along the plane passing through the axis of the guide member 32 and orthogonal to the rotation axis of the engaging member 21, and the cable 24 is connected at a position offset from the axis of the support pin 60 of the rotor 58.

Furthermore, the rotor 58 is provided with, as an integral part, a coupling arm 58a facing the lateral side of the lower part of the slider 19, and a coupling pin 62 that runs into a coupling recessed part 61 provided on the side face of the lower part of the slider 19 is provided in a protruding manner on the coupling arm 58a. Thus, the width in an up-and-down direction of the coupling recessed part 61 is set to be greater than the diameter of the coupling pin 62, and the coupling pin 62 runs into the coupling recessed part 61 in a manner movable upward or downward in the coupling recessed part 61.

Furthermore, a spring 63 that urges the rotor 58 to rotate toward the side on which the cable 24 is extended is provided between the rotor 58 and the support protrusion 30a, and the coupling pin 62 is located in a lower part in the coupling recessed part 61 when no pulling force acts on the cable 24.

The movement restricting means 26 includes the slider 19 and the nut 45, and when the lock pin 18 and the slider 19 are at the unlocked position, the second contacting section 45b of the nut 45 located at the unlock operating position engages with the arm 19a of the slider 19 from the locked position side, and the movement of the slider 19 and lock pin 18 toward the locked position side is thereby restricted. Furthermore, the nut 45 moves from the unlock operating position to the lock operating position through the operation of the electric motor 22, and the restriction of the movement of the slider 19 toward the locked position side by the second contacting section 45b is released.

Figure 8:
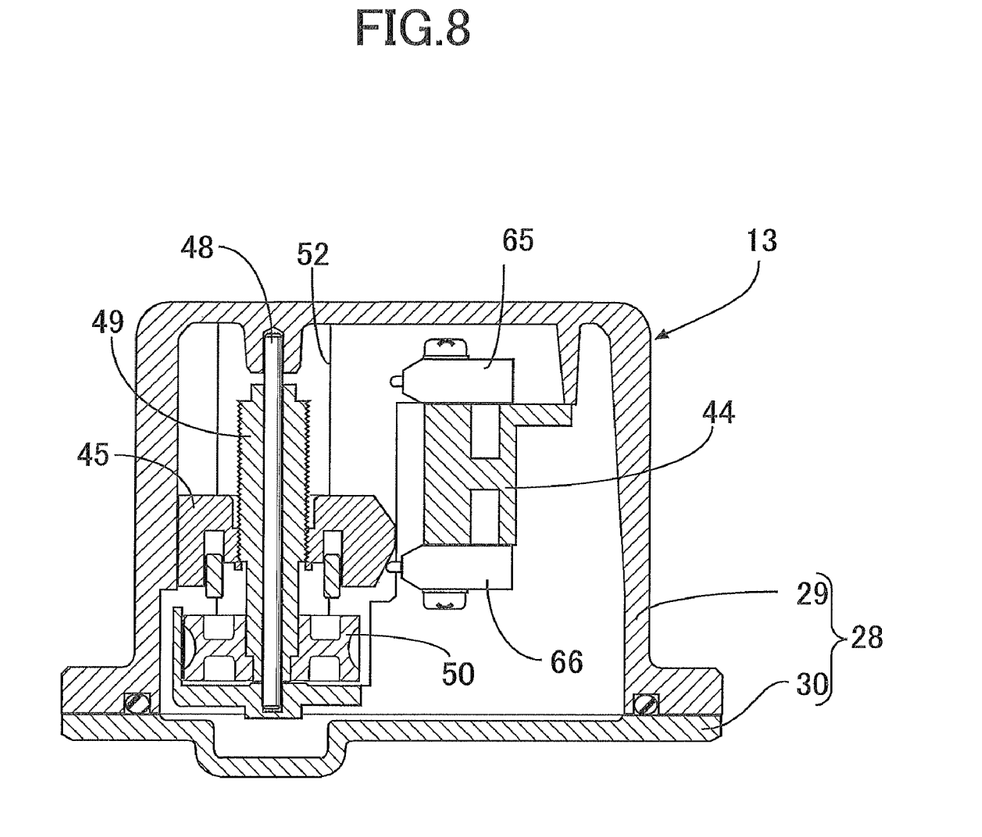
FIG. 8 is a cross-sectional view taken along a line 8-8 in FIG. 3.

Referring to FIG. 8 as well, the support frame 44 is provided with a first switch 65 as locked position detecting means that contacts the nut 45 and turns ON when the nut 45 is at the lock operating position, and a second switch 66 that contacts the nut 45 and turns ON when the nut 45 is at the unlock operating position. Furthermore, the support frame 44 is provided with a third switch 67 (see FIG. 2 to FIG. 4) that contacts the lower part of the slider 19 and turns ON when the lock pin 18 and the slider 19 are at the unlocked position, a fourth switch 68 (see FIG. 2 and FIG. 3) as locked position detecting means that contacts the engaging member 21 and turns ON when the nut 45 moves to the unlock operating position and the engaging member 21 rotates to the disengagement position accordingly, but turns OFF when the nut 45 moves to the lock operating position and the engaging member 21 rotates to the engagement position accordingly, and a fifth switch 69 (see FIG. 4 and FIG. 5) as pulling operation detecting means that contacts the rotor 58 and turns ON in a state in which the lock pin 18 and slider 19 are at the unlocked position when the cable 24 is not pulled, but turns OFF when the pulling of the cable 24 causes the rotor 58 to slightly rotate by an amount that the coupling pin 62 of the rotor 58 moves upward in the coupling recessed part 61 of the slider 19.

Figure 9:
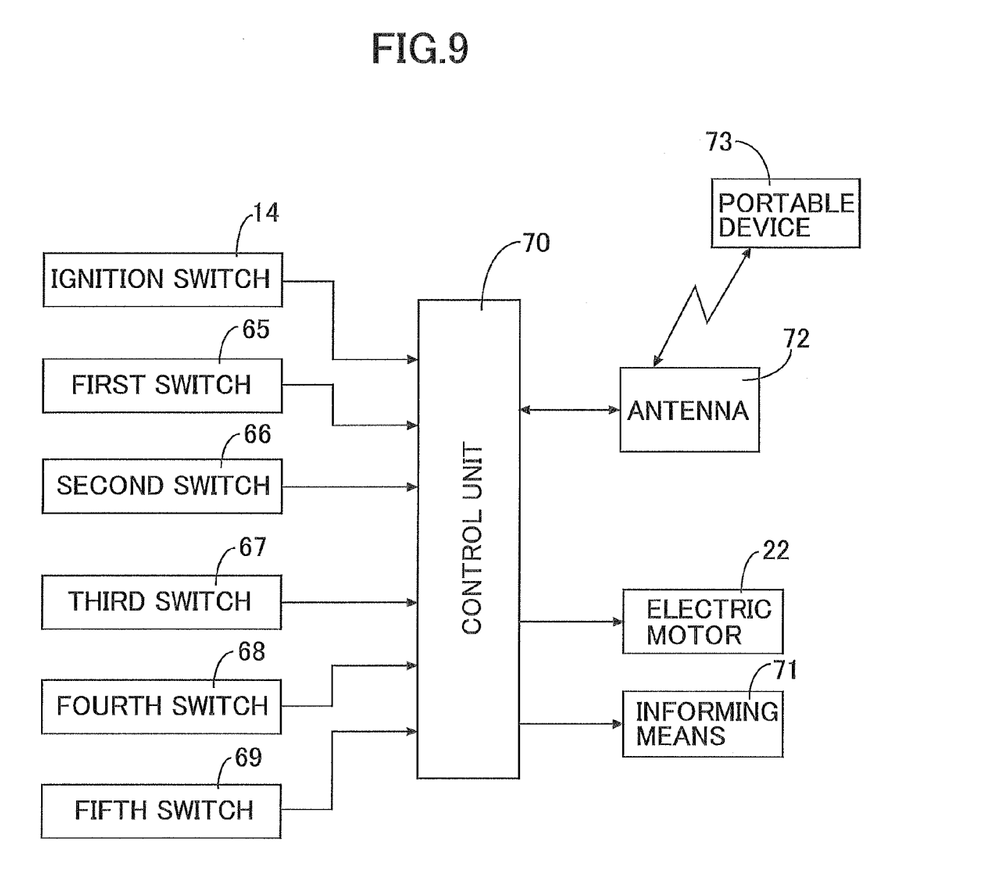
FIG. 9 is a block diagram showing a configuration of control system.

In FIG. 9, signals from the first to fifth switches 65 to 69 and ignition switch 14 are inputted to a control unit 70 mounted on the two-wheeled motor vehicle. When a state in which, although the fifth switch 69 is turned OFF in response to the operation of the handle lock lever 15 by the vehicle driver to move the lock pin 18 to the locked position, the first switch 65 remains OFF and the fourth switch 68 remains ON continues for a predetermined time and it is confirmed that the lock pin 18 does not move to the locked position, the control unit 70 controls the operation of informing means 71 such as an indicator made up of an LED so as to perform informing operation and also operates the electric motor 22 so that the second contacting section 45b of the nut 45 presses the arm 19a of the slider 19 and forcibly moves the slider 19 and the lock pin 18 to the unlocked position side.

Furthermore, the control unit 70 has a function of controlling communication between an antenna 72 mounted on the two-wheeled motor vehicle and a portable device 73 held by the user and also judging through the communication whether or not the portable device 73 held by the user is a legitimate portable device. The control unit 70 carries out communication between the antenna 72 and the portable device 73 when the fifth switch 69 turns OFF in response to an operation of the handle lock lever 15 by the vehicle driver so as to move the lock pin 18 to the locked position, and checks through the communication whether or not the vehicle driver is a legitimate user. At this time, when it is confirmed that the user is legitimate, the control unit 70 allows the electric motor 22 to operate so as to release the movement restriction by the movement restricting means 26.

Furthermore, when the vehicle driver operates the ignition switch 14, the control unit 70 allows a signal from the ignition switch 14 to be inputted to an ignition control unit (not shown) when the control unit 70 confirms that the first switch 65 is OFF state, and the second and third switches 66 and 67 are ON state, that is, the nut 45 is in the unlock operating position, and the lock pin 18 and the slider 19 are in the unlocked position.

Next, operations of the present embodiment will be described. The lock pin 18 that can operate between the locked position at which the lock pin 18 engages with the top bridge 17 of the front fork 16 linking with the steering handle 12 and the unlocked position at which the lock pin 18 releases engagement with the top bridge 17 is coupled with the slider 19 that operates together with the lock pin 18, the lock pin 18 and the slider 19 are resiliently urged toward the unlocked position side with the coil spring 20, and the electric motor 22 exerts power to cause the engaging member 21, which engages with the arm 19a of the slider 19 in the locked position from below and holds the slider 19 in the locked position, to operate toward the side on which engagement with the slider 19 is released; but since the forced unlocking drive means 23 forcibly drives the slider 19 toward the unlocked position side in response to the operation of the electric motor 22 when the lock pin 18 is in the locked position, not only the resilient urging force by the coil spring 20 toward the unlocked position side but also the output of the electric motor 22 is transmitted to the slider 19 from the forced unlocking drive means 23, and it is thereby possible, even when a force in the rotation direction is applied to the top bridge 17 that rotates together with the steering handle 12, to release engagement of the lock pin 18 with the top bridge 17 and reliably set the unlocked state.

Furthermore, the engaging member 21 is rotatably supported by the casing 28 so as to be rotatable around the axis disposed on the plane orthogonal to the linear slide operation direction of the slider 19 between the engagement position at which the engaging member 21 engages with the slider 19 in the locked position from the unlocked position side and the disengagement position at which the engaging member 21 retracts laterally of the slider 19 and releases engagement with the slider 19, and the engaging member 21 is urged toward the engagement position side with the torsion spring 43; therefore, when the engaging member 21 is engaged with the slider 19, it is possible to set a small resilient load of the torsion spring 43 by making the direction of the load acting on the engaging member 21 from the slider 19 and the resilient urging direction of the torsion spring 43 orthogonal to each other.

Furthermore, the forced unlocking drive means 23 includes the nut 45 that can move in response to the operation of the electric motor 22 in a direction parallel to the slide operation direction of the slider 19 between the lock operating position when the slider 19 is at the locked position and the unlock operating position when the slider 19 is at the unlocked position, and the nut 45 is provided with the first contacting section 45a that contacts the engaging member 21 in the engagement position and drives the engaging member 21 to rotate toward the disengagement position side at the time of movement from the lock operating position to the unlock operating position and the second contacting section 45b that contacts the slider 19 in the engagement position and presses and drives the slider 19 toward the unlocked position side at the time of movement from the lock operating position to the unlock operating position; therefore by moving the nut 45 from the lock operating position to the unlock operating position in response to the operation of the electric motor 22, it is possible to cause the first contacting section 45a to contact the engaging member 21, so that the engaging member 21 is caused to rotate toward the disengagement position side against the urging force of the torsion spring 43, and further by causing the second contacting section 45b to contact the slider 19 whose engagement with the engaging member 21 is released, the second contacting section 45b can press and drive the slider 19 toward the unlocked position side.

Furthermore, the tubular guide member 32 that allows the lock pin 18 to be slidably fitted is continuously provided so as to protrude from the casing 28, in the casing 28 in which the electric motor 22 is accommodated, the ring-shaped second sealing member 37 is interposed between the guide member 32 and the lock pin 18; it is thereby possible to reliably prevent rainwater or the like from infiltrating into the casing 28 through the gap between the lock pin 18 and guide member 32 and thereby prevent rainwater or the like from adversely affecting electric parts such as the electric motor 22 accommodated in the casing 28.

Furthermore, the guide member 32 is provided with the small diameter slide hole 35 that allows the lock pin 18 to be slidably fitted and the insertion hole 36 of larger diameter than that of the small diameter slide hole 35 and disposed coaxially with the outer end of the small diameter slide hole 35, and the second sealing member 37 is attached to the inner periphery of the insertion hole 36 so as to be resiliently in sliding contact with the outer periphery of the lock pin 18; therefore, the second sealing member 37 can prevent rainwater or the like from infiltrating into the gap between the inner periphery of the small diameter slide hole 35 and the outer periphery of the lock pin 18, and prevent an occurrence of the state in which rainwater or the like infiltrated in the gap between the inner periphery of the small diameter slide hole 35 and the outer periphery of the lock pin 18 freezes and thus the lock pin 18 can not slide smoothly.

Furthermore, the guide member 32 is disposed so as to extend in the up-and-down direction below the top bridge 17 and the guide member 32 is provided with the drain cutout 38 above the second sealing member 37; it is thereby possible to prevent rainwater or the like from accumulating on the upper part of the guide member 32.

Furthermore, the state in which the lock pin 18 is in the unlocked position can be detected by the second and third switches 66 and 67, and when the fifth switch 69 detects that the vehicle driver operates the handle lock lever 15 so as to move the lock pin 18 in the unlocked position to the locked position, the control unit 70 causes, when a signal indicating that the lock pin 18 has moved to the locked position is not inputted from the first and fourth switches 65 and 68, the informing means 71 to perform informing operation; therefore, it is possible to prevent the vehicle driver from mistaking for a locked state a state in which the lock pin 18 is hold in a midway locked state by a traverse load applied to the steering handle 12 before the lock pin 18 reaches the locked position, and notify the vehicle driver of the fact that the lock pin 18 has not completely reached the locked position and thereby improve the level of burglar prevention.

Moreover, when it is confirmed that the lock pin 18 does not move to the locked position, the electric motor 22 is operated to forcibly move the slider 19 and lock pin 18 to the unlocked position side; it is thereby possible to release the state in which the lock pin 18 is held in the midway locked state, forcibly drive the lock pin 18 toward the unlocked position side, and move the lock pin 18 to the locked position through the pulling operation of the cable 24 by the vehicle driver again.

Furthermore, to operate the lock pin 18 from the unlocked position to the locked position, it is only necessary to pull the cable 24 using the handle lock lever 15, and the cable locking drive means 25 thereby causes the lock pin 18 to operate from the unlocked position to the locked position; the movement restricting means 26 that restricts the movement of the lock pin 18 from the unlocked position to the locked position is configured so as to release the restriction in response to the operation of the electric motor 22, and the control unit 70 carries out communication with the portable device 73 held by the user in response to detection of the pulling operation of the cable 24 by the fifth switch 69 and causes the electric motor 22 to operate upon confirming through the communication that the user is legitimate. Therefore, the movement restricting means 26 prevents the lock pin 18 from moving to the locked position unless the user is authenticated as a legitimate person who possesses the legitimate portable device 73 when the user tries to operate and pull the cable 24 to move the lock pin 18 to the locked position, and thus even if a third party other than the legitimate user operates the cable 24 with malicious intent, undesirable movement of the lock pin 18 to the locked position will never be made.

Although the embodiment of the present invention has been described so far, the present invention is not limited to the above described embodiment, but various modifications can be made without departing from the gist of the present invention.

For example, in the above described embodiment, when the cable 24 is pulled using the handle lock lever 15, the electric motor 22 is operated upon confirming that the user is legitimate to release movement restriction by the movement restricting means 26, but it is also possible to move the lock pin 18 to the locked position by pulling operation of the cable 24 without confirming that the user is legitimate.

What is claimed is:

1. A vehicle handle locking apparatus for a vehicle having a steering handle or a linkage member that operates together with the steering handle, the locking apparatus comprising:
   a fixed casing;
   a locking member that can operate between a locked position in which the locking member engages with the steering handle or the linkage member and an unlocked position in which engagement of the locking member with the steering handle or the linkage member is released;
   a holding member that holds the locking member so as to operate together with the locking member;
   a first resilient member that resiliently urges the locking member and the holding member toward the unlocked position;
   an engaging member that engages with the holding member in the locked position and holds the locking member in the locked position;
   an electric actuator that at least exerts power causing the engaging member to operate toward a position where engagement of the engaging member with the holding member in the locked position is released; and
   a forced unlocking drive means for forcibly driving the holding member toward the unlocked position that is configured to operate, in response to operation of the electric actuator in a state in which the locking member is in the locked position, to abut against the holding member and forcibly drive the holding member toward the unlocked position.

2. The vehicle handle locking apparatus according to claim 1, wherein
   the engaging member is rotatably supported by the fixed casing so as to be rotatable around an axis disposed on a plane orthogonal to a linear slide operation direction of the holding member between an engagement position at which the engaging member engages with the holding member in the locked position from the unlocked position and a disengagement position at which the engaging member retracts laterally of the holding member and releases engagement thereof with the holding member, and
   a second resilient member that urges the engaging member toward the engagement position is provided between the casing and the engaging member.

3. The vehicle handle locking apparatus according to claim 2, wherein
   the forced unlocking drive means comprises a movable member that can move in response to operation of the electric actuator in a direction parallel to the slide operation direction of the holding member between a lock operating position when the holding member is in the locked position and an unlock operating position when the holding member is in the unlocked position, and
   the movable member comprises:
   a first contacting section that contacts with the engaging member in the engagement position at the time when the movable member moves from the lock operating position to the unlock operating position, and drives the engaging member to rotate toward the disengagement position; and
   a second contacting section that contacts with the holding member in the engagement position at the time when the movable member moves from the lock operating position to the unlock operating position, and presses and drives the holding member toward the unlocked position.

4. The vehicle handle locking apparatus according to claim 1, wherein
   a tubular guide member that allows the lock pin, which is the locking member, to slide between the locked position and the unlocked position and fit thereinto in a slidable manner is connectingly provided in the fixed casing that accommodates the electric actuator which exerts power to move the lock pin toward at least one of the locked position and the unlocked position, so as to protrude from the casing, and
   a ring-shaped sealing member is interposed between the guide member and the lock pin.

5. The vehicle handle locking apparatus according to claim 4, wherein
   the guide member comprises a slide hole that allows the lock pin to slidably fit thereinto and an insertion hole having a diameter larger than that of the slide hole and provided continuously and coaxially with an outer end of the slide hole, and
   the sealing member is mounted to an inner periphery of the insertion hole so as to be resiliently in sliding contact with an outer periphery of the lock pin.

6. The vehicle handle locking apparatus according to claim 4 or 5, wherein
   the guide member extending in an up-and-down direction is disposed below a portion to be engaged which is provided to the steering handle or the linkage member, and
   the guide member is provided with a drain cutout above the sealing member.

7. The vehicle handle locking apparatus according to claim 1, further comprising:
   cable locking drive means moving together and linked with the locking member so that a pulling operation of a cable causes the locking member to operate from the unlocked position to the locked position;
   pulling operation detecting means for detecting the pulling operation of the cable;
   movement restricting means that enables restriction of movement of the locking member from the unlocked position to the locked position and releases the restriction in response to operation of the electric actuator; and
   a control unit that carries out communication with a portable device held by a user in response to detection of the pulling operation of the cable by the pulling operation detecting means, and causes the electric actuator to operate so as to release the movement restriction by the movement restricting means in response to confirmation through the communication that the user is a legitimate user.

8. The vehicle handle locking apparatus according to claim 7, wherein
   the movement restricting means comprises: the holding member, one end of which is connected to the locking member so as to operate together with the locking member and the other end of which moves together with and is connected to the cable; and a movable member that engages with the holding member from the locked position when the locking member and the holding member are in the unlocked position and moves in a direction parallel to an operating direction of the holding member through operation of the electric actuator, and
   the control unit controls the operation of the electric actuator so as to cause the movable member to move in a direction in which engagement thereof with the holding member is released when releasing the movement restriction by the movement restricting means.

9. The vehicle handle locking apparatus according to claim 7 or 8, further comprising:
   locked position detecting means for detecting that the locking member is in the locked position and inputting a signal of the detection to the control unit; and
   informing means operated and controlled by the control unit,
   wherein the control unit causes the informing means to perform an informing operation when the pulling operation detecting means detects a pulling operation of the cable and when the signal detecting that the locking member is in the locked position is not inputted from the locked position detecting means.

10. The vehicle handle locking apparatus according to claim 8, further comprising locked position detecting means for detecting that the locking member is in the locked position and inputting a signal of the detection to the control unit,
    wherein the control unit causes the electric actuator to operate so as to move the movable member so that the holding member is pressed and driven toward the unlocked position when the pulling operation detecting means detects a pulling operation of the cable and when the signal detecting that the locking member is in the locked position is not inputted from the locked position detecting means.

* * * * *